US012609805B2

(12) United States Patent
Ye

(10) Patent No.: US 12,609,805 B2
(45) Date of Patent: Apr. 21, 2026

(54) BANDWIDTH PART SWITCHING IN A COMMUNICATION NETWORK

(71) Applicant: GOOGLE LLC, Mountain View, CA (US)

(72) Inventor: Shiangrung Ye, New Taipei (TW)

(73) Assignee: GOOGLE LLC, Mountain View, CA (US)

( * ) Notice: Subject to any disclaimer, the term of this patent is extended or adjusted under 35 U.S.C. 154(b) by 534 days.

(21) Appl. No.: 17/430,661

(22) PCT Filed: Feb. 5, 2020

(86) PCT No.: PCT/US2020/016802
§ 371 (c)(1),
(2) Date: Aug. 12, 2021

(87) PCT Pub. No.: WO2020/167554
PCT Pub. Date: Aug. 20, 2020

(65) Prior Publication Data
US 2022/0150036 A1 May 12, 2022

Related U.S. Application Data

(60) Provisional application No. 62/804,610, filed on Feb. 12, 2019.

(51) Int. Cl.
*H04W 76/20* (2018.01)
*H04L 5/00* (2006.01)
(Continued)

(52) U.S. Cl.
CPC ......... *H04L 5/0098* (2013.01); *H04W 72/044* (2013.01); *H04W 72/23* (2023.01); *H04W 76/20* (2018.02)

(58) Field of Classification Search
CPC ... H04L 5/0098; H04L 5/0051; H04L 5/0053; H04L 5/001; H04W 72/044; H04W 72/23; H04W 76/20; H04W 72/0453
See application file for complete search history.

(56) References Cited

U.S. PATENT DOCUMENTS

2018/0139778 A1* 5/2018 Chou .................... H04W 74/04
2019/0044689 A1 2/2019 Yiu et al.
(Continued)

FOREIGN PATENT DOCUMENTS

CN 107667557 A 2/2018
CN 108809602 A 11/2018
(Continued)

OTHER PUBLICATIONS

"5G; NR; Medium Access Control (MAC) Protocol Specification (3GPP TS 38.321 version 15.3.0 Release 15)," ETSI Technical Specification (2018).
International Search Report and Written Opinion for Application No. PCT/US2020/016802, dated Jun. 5, 2020.
LG Electronics Inc., UE Autonomous BWP Switching for Configured UL, 3GPP Draft (2018).
(Continued)

*Primary Examiner* — Robert M Morlan
(74) *Attorney, Agent, or Firm* — MARSHALL, GERSTEIN & BORUN LLP

(57) ABSTRACT

A user equipment, UE, switches between UL BWPs to perform a random access procedure. A base station transmits a configuration specifying multiple UL BWPs on a NUL carrier and a SUL carrier (802). Because the base station selects the configuration for the UE, the base station is aware of the UL BWP which the UE will select as the active UL BWP as well as the UL BWP to which the UE will switch if the UE lacks RACH resources or if the UE decides to switch the between the NUL and SUL carriers. The base station attempts (804) to detect transmission from the UE on the active UL BWP as well as the initial UL BWP of the same NUL (or SUL) carrier.

18 Claims, 8 Drawing Sheets

(51) Int. Cl.
  *H04W 72/044*    (2023.01)
  *H04W 72/23*    (2023.01)

(56)        References Cited

U.S. PATENT DOCUMENTS

| | | | | |
|---|---|---|---|---|
| 2019/0103954 | A1 | | 4/2019 | Lee et al. |
| 2019/0141546 | A1 | | 5/2019 | Zhou et al. |
| 2019/0246442 | A1 | * | 8/2019 | Park ..................... H04L 5/0055 |
| 2019/0268965 | A1 | * | 8/2019 | Jang ..................... H04W 72/12 |
| 2019/0296805 | A1 | | 9/2019 | Son |
| 2020/0145169 | A1 | * | 5/2020 | Zhou ..................... H04W 76/27 |
| 2020/0229180 | A1 | * | 7/2020 | Liu ....................... H04L 5/0092 |
| 2023/0140356 | A1 | * | 5/2023 | Kim .................. H04W 72/0473 |
| | | | | 370/230 |
| 2023/0308989 | A1 | * | 9/2023 | Babaei ................ H04W 74/006 |

FOREIGN PATENT DOCUMENTS

| | | | | | |
|---|---|---|---|---|---|
| CN | 108886804 | A | | 11/2018 | |
| CN | 109121205 | A | | 1/2019 | |
| EP | 3528582 | A1 | * | 8/2019 | ........ H04W 36/0069 |

OTHER PUBLICATIONS

LG Electronics Inc., "BWP Switching for RACH," 3GPP (2018).
OPPO, "BWP Switching Due to LBT," 3GPP (2018).
First Office Action for Chinese Application No. 202080028224.7, dated Oct. 21, 2023.
"3rd Generation Partnership Project; Technical Specification Group Radio Access Network; NR; Medium Access Control (MAC) Protocol Specification (Release 15)," 3GPP TS 38.321 (2018).
Office Action for Korean Application No. 10-2021-7029036, dated Apr. 28, 2025.
"3rd Generation Partnership Project; Technical Specification Group Radio Access Network; NR; Medium Access Control (MAC) protocol specification (Release 15)," 3GPP TS 38.321 V15.4.0 (2018).
"3rd Generation Partnership Project; Technical Specification Group Radio Access Network; NR; Multiplexing and channel coding (Release 15)," 3GPP TS 38.212 V15.4.0 (2018).
"3rd Generation Partnership Project; Technical Specification Group Radio Access Network; NR; NR and NG-RAN Overall Description; Stage 2 (Release 15)," 3GPP TS 38.300 V15.3.0 (2018).
"3rd Generation Partnership Project; Technical Specification Group Radio Access Network; NR; Physical channels and modulation (Release 15)," 3GPP TS 38.211 V15.4.0 (2018).

* cited by examiner

100

600

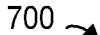

700

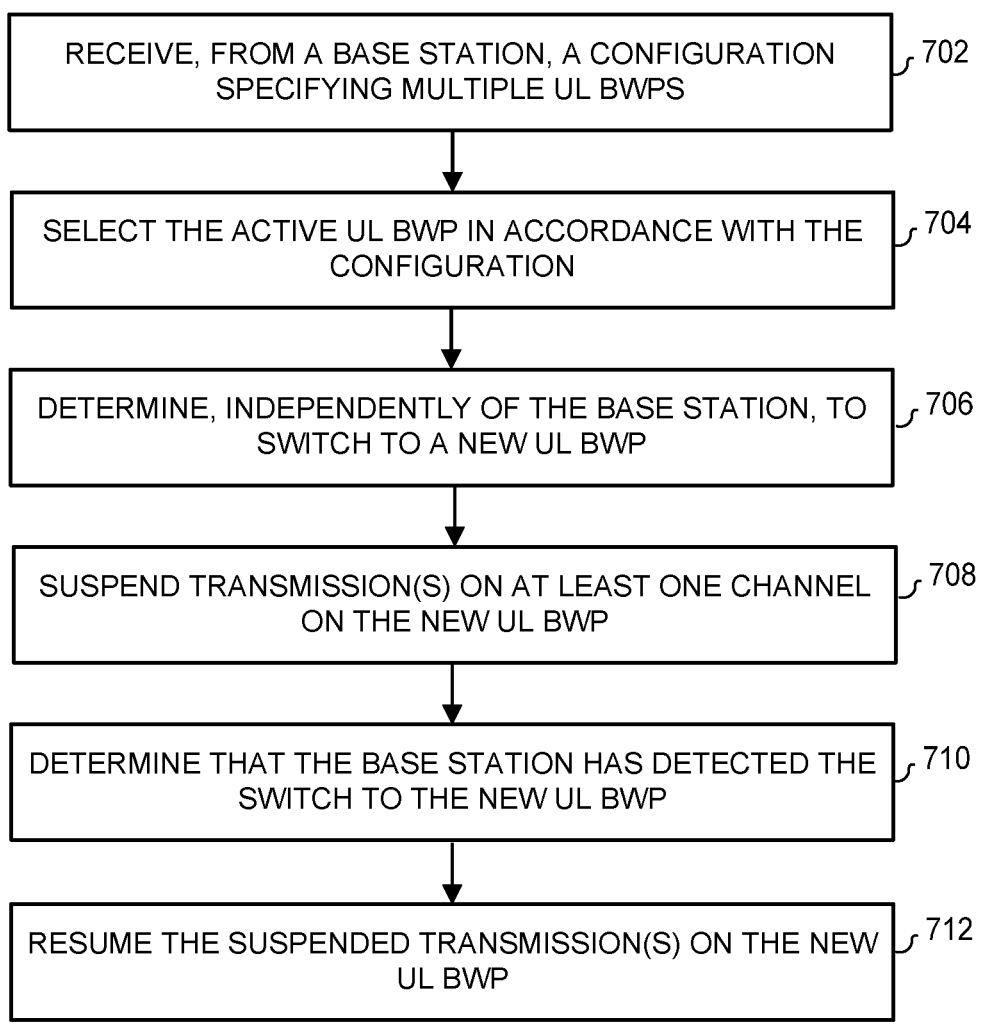

| RECEIVE, FROM A BASE STATION, A CONFIGURATION SPECIFYING MULTIPLE UL BWPS | 702 |

| SELECT THE ACTIVE UL BWP IN ACCORDANCE WITH THE CONFIGURATION | 704 |

| DETERMINE, INDEPENDENTLY OF THE BASE STATION, TO SWITCH TO A NEW UL BWP | 706 |

| SUSPEND TRANSMISSION(S) ON AT LEAST ONE CHANNEL ON THE NEW UL BWP | 708 |

| DETERMINE THAT THE BASE STATION HAS DETECTED THE SWITCH TO THE NEW UL BWP | 710 |

| RESUME THE SUSPENDED TRANSMISSION(S) ON THE NEW UL BWP | 712 |

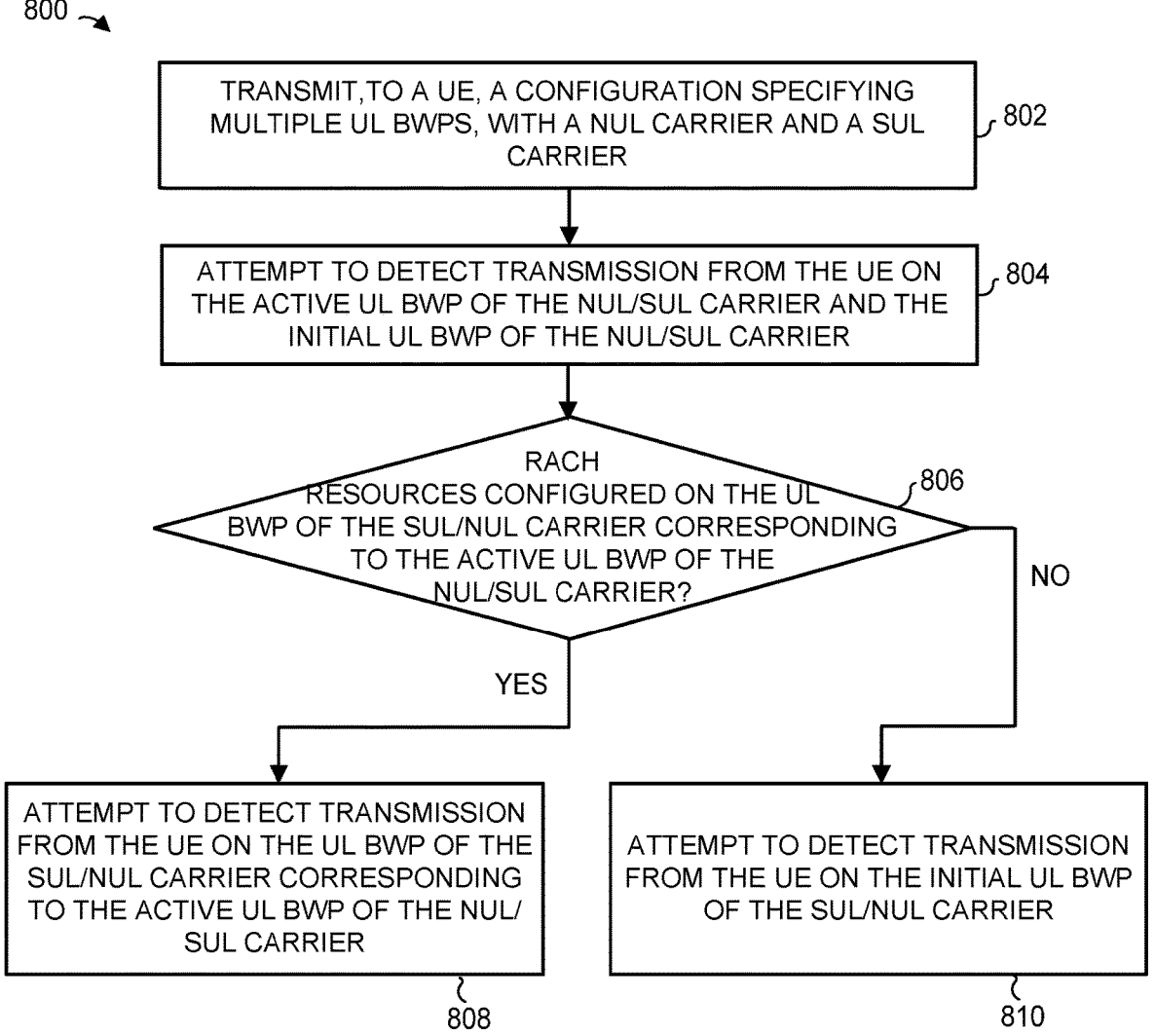

TRANSMIT,TO A UE, A CONFIGURATION SPECIFYING MULTIPLE UL BWPS, WITH A NUL CARRIER AND A SUL CARRIER ⌡ 802

ATTEMPT TO DETECT TRANSMISSION FROM THE UE ON THE ACTIVE UL BWP OF THE NUL/SUL CARRIER AND THE INITIAL UL BWP OF THE NUL/SUL CARRIER ⌡ 804

RACH RESOURCES CONFIGURED ON THE UL BWP OF THE SUL/NUL CARRIER CORRESPONDING TO THE ACTIVE UL BWP OF THE NUL/SUL CARRIER? ⌡ 806

NO

YES

ATTEMPT TO DETECT TRANSMISSION FROM THE UE ON THE UL BWP OF THE SUL/NUL CARRIER CORRESPONDING TO THE ACTIVE UL BWP OF THE NUL/ SUL CARRIER

808

ATTEMPT TO DETECT TRANSMISSION FROM THE UE ON THE INITIAL UL BWP OF THE SUL/NUL CARRIER

BANDWIDTH PART SWITCHING IN A COMMUNICATION NETWORK

FIELD OF THE DISCLOSURE

This disclosure relates to wireless communications and, more particularly, to managing uplink bandwidth part switching on the radio interface.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

5G New Radio (NR) systems will support supplementary uplink (SUL) communications in a cell to provide better coverage in the uplink direction. Unlike with one normal uplink (NUL) carrier and one normal downlink (NDL) carrier, such a cell includes one NUL carrier, one SUL carrier, and NDL carrier.

A 5G NR base station can configure a user device (or "UE," which stands for "user equipment") to operate within a certain bandwidth part (BWP), or a portion of a wide carrier bandwidth. The specification 3GPP TS 38.211 version 15.3.0 defines a BWP as a contiguous set of physical resource blocks on a given carrier. As a more specific example, the full carrier bandwidth may be 80 MHz, the UE can be capable of a maximum carrier bandwidth of 20 MHz, and a base station accordingly can configure a 20 MHz BWP for the user device. As another specific example, the full carrier bandwidth may be 200 MHz, the UE may be capable of a maximum carrier bandwidth of 100 MHz, and the base station accordingly can configure a BWP of 100 MHz for the user device.

According to the 3GPP standards related to medium access control (MAC) operation, a UE performing a random access procedure (RACH) to synchronize communication over a radio interface can determine whether to switch from the NUL to the SUL or from the SUL to the NUL. When the UE determines that it should switch between the NUL and the SUL, the UE autonomously performs the switching, without a command from the base station and without notifying the base station. Moreover, the UE in some cases determines that it has no RACH resources (time-frequency resources to transmit a preamble) for transmit on the active uplink (UL) BWP, and automatically switches to the initial UL BWP on the given carrier. In this situation, the UE again makes this decision independently of the base station and does not notify the base station of the switch.

As a result, the base station in these cases can miss an uplink transmission from the UE. For example, the base station can miss a Sounding Reference Signal (SRS) transmission, a Physical Uplink Shared Channel (PUSCH) transmission, or a Physical Uplink Control Channel (PUCCH) transmission.

SUMMARY

According to one of the techniques of this disclosure, a UE switches between UL BWPs and suspends transmissions on the new UL BWP until the base station has determined that the switch has occurred. The UL BWP from which the UE switches and the UL BWP to which the UE switches can be both on the NUL carrier, both on the SUL carrier, or one UL BWP can be on the NUL carrier and the other can be on the SUL carrier. The UE can notify the base station that the switch has occurred, in at least some of the implementations. For example, the UE can transmit a random access preamble on the new UL BWP, and the base station can respond with a downlink control information (DCI) on the Physical Downlink Channel (PDCCH). The UE then resumes the transmission on the new UL BWP.

According to another techniques of this disclosure, after switching between UL BWPs, a UE proceeds to transmit on the new UL BWP. The base station however monitors the new UL BWP to detect a possible transmission from the UE.

In both cases, the base station can provide an initial configuration including both UL BWPs to the UE. Thus, although the base station is not aware of the switch at the UE until the UE notifies the base station, or until the base station receives an uplink transmission on the new UL BWP, the base station is aware of the UL BWPs to which the UE potentially can switch.

Further, some systems can implement a combination of the two solutions, so that for example the UE can notify the base station of the switch for the purposes SRS/PUCCH transmissions, and the base station can monitor multiple UL BWPs for the purposes of PUSCH transmissions in accordance with the second solution.

One example embodiment of these techniques is a method in a UE for switching between UL BWPs to perform a random access procedure. The method can be executed by processing hardware and includes receiving, by from a base station, a configuration specifying several UL BWPs; determining, at the UE independently of the base station, that the UE should switch from a first UL BWP to a second UL BWP; in response to the determining, switching from the first UL BWP to the second UL BWP; receiving an indication that the base station has determined that the UE has switched from the first UL BWP to the second UL BWP; and suspending transmission on at least one channel on the second UL BWP until the indication is received from the base station.

Another example embodiment of these techniques is a UE including processing hardware configured to execute the method above.

Yet another example embodiment of these techniques is method in a base station for receiving uplink transmissions from a UE. The method can be executed by processing hardware and includes transmitting, to the UE, a configuration including respective time-frequency resources for each of several UL BWPs; receiving a first transmission from the UE on a first one of the several UL BWPs; identifying, at the base station independently of the UE, a second one of the several UL BWPs to which the UE is capable of switching; and attempting to receive a second transmission from the UE on the second one of the several UL BWPs.

Still another embodiment of these techniques is a base station including processing hardware configured to execute the method above.

BRIEF DESCRIPTION OF THE DRAWINGS

FIG. 7 is a flow diagram of an example method for switching between UL BWPs, which can be implemented in the UE of FIG. 1; and FIG. 8 is a flow diagram of an example method for receiving uplink transmissions from a UE, which can be implemented in the base station of FIG. 1.

DETAILED DESCRIPTION OF THE DRAWINGS

Generally speaking, the techniques of this disclosure allow a UE to autonomously switch between UL BWPs to perform a random access procedure, without the base station missing uplink transmissions from the UE. Some of these techniques can be implemented in UE, and some in a base station. As used herein, autonomous switching refers to the UE determining that it should switch between UL BWPs independently of the base station rather than in response to a command from the base station.

Switching between UL BWPs is discussed below with example reference to NR. However, in general the techniques of this disclosure also can apply to other radio access technologies (RATs).

Figure 1:
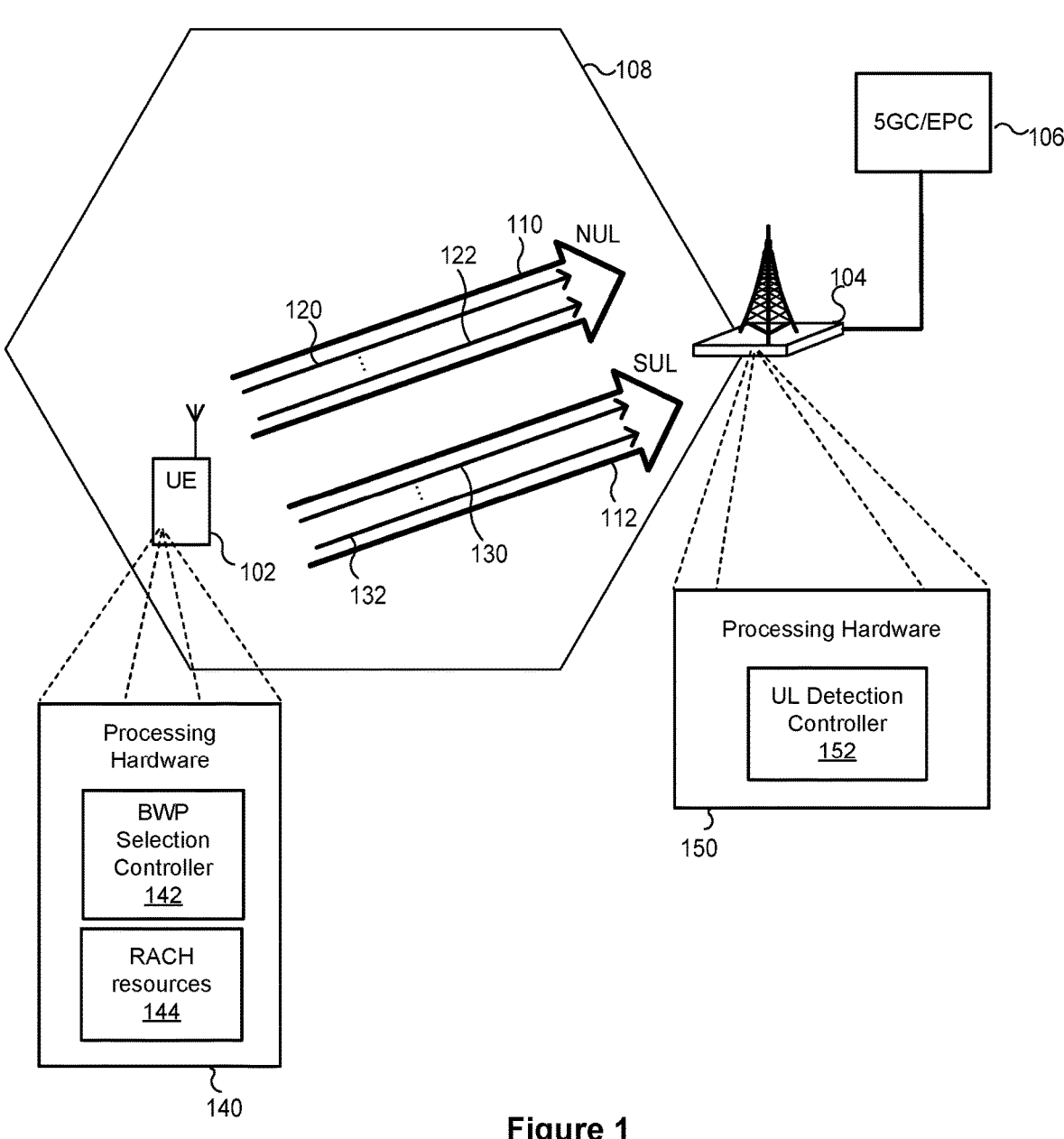
FIG. 1 is a block diagram of an example wireless communication system in which a baser station can configure a UE with multiple UL BWPs and a NUL carrier and a SUL carrier, and the UE can autonomously switch between the UL BWPs or the UL carriers.

Referring first to FIG. 1, a UE 102 can operate in an example wireless communication network 100. As discussed below, the UE 102 can be any suitable device capable of wireless communications. The wireless communication network 100 includes an NR base station 104 connected to an EPC or 5GC 106. The base station 104 operates as a next-generation evolved Node B (gNB) and covers an NR cell 108.

The base station 104 configures the UE 102 to communicate with the base station 104 over a NUL carrier 110 and a SUL carrier 112 in the uplink direction. The base station 104 associates the NUL carrier 110 and the SUL carrier 112 with the same cell 108. The base station 104 further configures the NUL carrier 110 with multiple UP BWPs including an initial UL BWP 120 and another UL BWP 122, which in some cases can be the active UL BWP. The base station 104 similarly configures SUL carrier 112 with multiple UP BWPs including an initial UL BWP 130 and another UL BWP 132, which in some cases can be the active UL BWP.

For example, the base station 104 can configure the NUL carrier 110 with four BWPs and assign respective BWP identifies to each BWP, e.g., #0, #1, #2, and #3. The base station 104 can configure the SUL carrier 112 in a similar manner and assign respective BWP identifies to each BWP of the SUL carrier 112.

The UE 102 can be equipped with processing hardware 140 that can include one or more general-purpose processors (e.g., CPUs) and a non-transitory computer-readable memory storing instructions that the one or more general-purpose processors execute. Additionally or alternatively, the processing hardware 140 can include special-purpose processing units.

The processing hardware 140 can include a BWP selection controller 142, implemented using any suitable combination of hardware, software, and firmware. For example, the BWP selection controller 142 can be implemented as a set of instructions that execute on one or more processors to execute the corresponding functions. In another implementation, the BWP selection controller 142 is implemented using firmware as a part of the wireless communication chipset. The memory of the processing hardware 140 can store random access procedure (RACH) resource identifiers 144, which can identify time-frequency resources. The RACH resource identifiers 144 can be implemented as any suitable data structure.

Similarly, the base station 104 can be equipped with processing hardware 150 that can include one or more general-purpose processors (e.g., CPUs) and a non-transitory computer-readable memory storing instructions that the one or more general-purpose processors execute. Additionally or alternatively, the processing hardware 150 can include special-purpose processing units. The processing hardware 150 can include a UL detection controller 152, which can be implemented using any suitable combination of hardware, software, and firmware.

The processing hardware 150 of the base station 104 initially configures the UE 102 with the NUL carrier 110, the SUL carrier 112, and the UL BWPs 120, 122, 130, 132, etc. The UE 102 at some point can initiate a random access procedure to obtain a communication channel, and the BWP selection controller 142 can determine whether the UE 102 should switch from the NUL carrier 110 to the SUL carrier 112, or back from the SUL carrier 112 to the NUL carrier 110, in accordance with the 3GPP TS 38.321 standard. The UE 102 for example can switch from UL BWP #2 on the NUL carrier 110 to UL BWP #2 on the SUL carrier 112.

Further, the UE 102 in some cases can determine that none of the RACH resource identifiers 144 represent available resources for transmitting a preamble on the active UL BWP, and the BWP selection controller 142 can determine that the UE 102 should switch from the active UL BWP to the initial UL BWP, also in accordance with the 3GPP TS 38.321 standard. The UE 102, for example, can switch from UL BWP #2 on the NUL carrier 110 to initial UL BWP #0 on the NUL carrier 110.

As discussed in more detail below, upon switching to the new UL BWP (which can be on the same or different NUL or SUL carrier), the BWP selection controller 142 in some implementations prevents the UE 102 from transmitting on the PUCCH channel or the SRS channel, as well as from using the configured grant to transmit on the PUSCH channel of the new UL BWP until the base station 104 has detected the switch. In other words, the UE 102 temporarily suspends at least some of the transmissions on the new UL BWP. After the UE 102 determines that the base station 104 is aware of the switch to the UL BWP, the UE 102 initiates a random access procedure on the new UL BWP.

As also discussed below, the base station 104 in some cases attempts to detect potential uplink transmissions from the UE on the PUCCH, SRS, or PUSCH channel to which the UE 102 potentially can switch. Further, the UE 102 and the base station 104 in some implementations can implement both techniques so that, for example, the UE 102 upon switching to a new UL BWP temporarily suspends PUCCH/ SRS transmissions but not PUSCH transmission using a configured grant, and the base station 104 accordingly monitors PUSCH transmissions on a UL BWP to which the UE 102 potentially can switch but not PUCCH/SRS transmissions.

These scenarios are discussed in more detail with reference to FIGS. 2-4.

Figure 2:
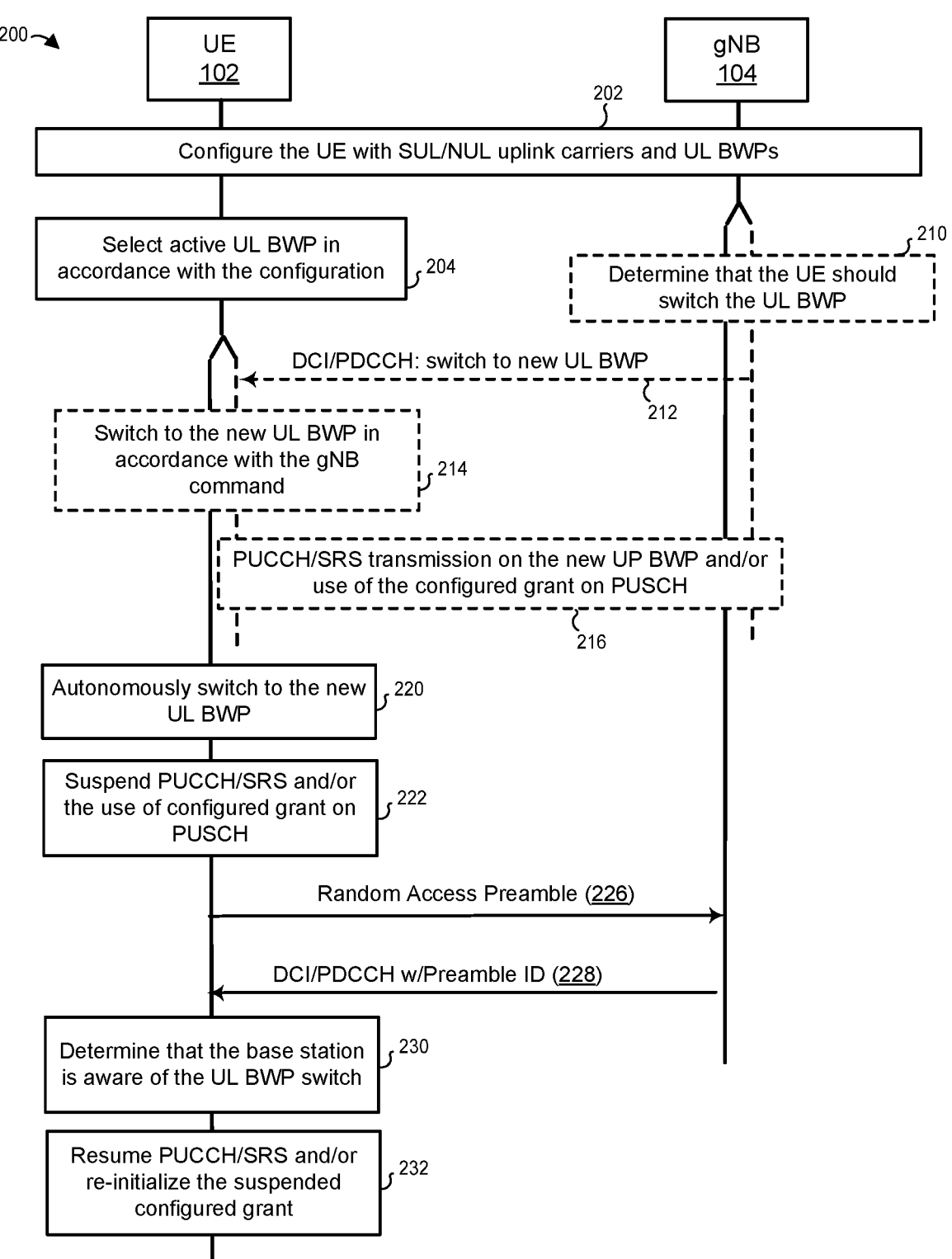
FIG. 2 is a messaging diagram of an example scenario in which the UE of FIG. 1 autonomously switches from one UL BWP to another UL BWP and suspends at least some of the transmissions on the new UL BWP until the base station has detected the switch.

Referring first to FIG. 2, the gNB 104 in this example scenario configures 202 the UE 102 with the SUL/NUL carriers and the UL BWPs. For each UL BWP, the gNB 104 can configure time-frequency resources for PUCCH/SRS transmissions. The gNB 104 also can configure each UL BWP with a configured grant and time-frequency resources for PUSCH transmission. The gNB 104 can provide this configuration, for example, in an RRCReconfiguration message during an RRC reconfiguration procedure, in an RRC-Setup message during an RRC connection establishment procedure, in an RRCResume or RRCSetup message during an RRC connection resume procedure, or in an RRCReestablishment message during an RRC re-establishment procedure. One such example procedure is discussed below with reference to FIG. 6. Further, the UE 102 can obtain some of this information, such as the configuration of the initial UL BWP, from the system information block (SIB) broadcast by the gNB 104 in the cell 108.

The UE 102 in this scenario selects 204 an active UL BWP on the NUL carrier in accordance with the received configuration. However, more generally the event 204 can occur after the UE 102 has switched between the NUL and SUL carriers (one or more times), or after the UE 102 has switched to a different UL BWP.

For clarity, FIG. 2 illustrates two sub-scenarios: one in which the gNB 104 determines that the UE 102 should switch to the new UL BWP (events 210-216), and one in which the UE 102 determines that it should switch to a new UL BWP (events 220-232). In either case, the decision to switch from the NUL carrier to the SUL carrier, or from the SUL carrier to the NUL carrier, can be based on any suitable channel status metric or a combination of multiple metrics. For example, the UE 102 and/or the gNB 104 can measure power level, pathloss, interference, traffic, etc. The decision to switch from the currently active UL BWP to the initial UL BWP on the same NUL or SUL carrier can be based on availability of RACH resources, for example.

The gNB 104 according to the first sub-scenario determines 210 that the UE 102 should switch to a new UL BWP. The gNB 104 transmits 212 a command to switch the UL BWP, to the UE 102. More particularly, the gNB 104 can transmit a DCI on the PDCCH. The UE 102 switches 214 to the new UL BWP in accordance with the received command. After the switching, the UE 102 starts to transmit 216 on the PUCCH or SRS channels of the new UL BWP. Additionally or alternatively, the UE 102 re-initializes the configured grant on the new UL BWP and uses the configured grant to transmit on the PUSCH channel. The UE 102 in this case does not suspend PUSCH, PUCCH, or SRS transmissions because the gNB 104 is aware of the switch.

In the second sub-scenario, the UE 102 autonomously switches 220 from the active UL BWP to another UL BWP. For example, the UE 102 can determine that there are no RACH resources configured on the active UL BWP and determine, independently of the gNB 104, to switch to the initial UL BWP. The UL BWP to which the UE 102 switches in this case is on the same uplink carrier (SUL or NUL) as the active UL BWP. As another example, the UE 102 can switch from the active UL BWP on the NUL carrier to a UL BWP on the SUL carrier, or from the active UL BWP on the SUL carrier to a UL BWP on the NUL carrier. When RACH resources are available on the new UL BWP, the UE 102 for example can switch from the UL BWP carrier #2 on one of the NUL and SUL carriers to the UL BWP carrier #2 on the other one of the NUL and SUL carriers. If the UE 102 lacks RACH configuration for the UL BWP #2 on the new (NUL or SUL) carrier, the UE 102 can switch to the initial UL BWP on that carrier.

With continued reference to FIG. 2, the UE 102 suspends 222 at least some of the transmissions on the new UL BWP until the gNB 104 has detected the switch. Thus, the BWP selection controller 142 (see FIG. 1) or another suitable component of the processing hardware 140 prevents the UE 102 from using the resources on at least some of the channels.

In particular, the BWP selection controller 142 can prevent the UE 102 from using PUCCH/SRS resources to transmit on the PUCCH/SRS channels. According to one implementation, the UE 102 temporarily suspends these resources but does not release the resources. The UE 102 in other words retains the PUCCH/SRS resources, in this implementation. According to another implementation, the event 222 includes the UE 102 releasing the PUCCH/SRS resources, and accordingly not transmitting on the PUCCH/ SRS channels due to lack to resources. In contrast to the event 222, when the UE 102 operates to the first sub-scenario (events 210, 212, 214, and 216), the UE 102 does not suspend or release the PUCCH/SRS resources.

In some cases, after autonomously switching from the active UL BWP to the new (second) UL BWP, the UE 102 switches from the new UL BWP to yet another (third) UL BWP. The UE 102 in this case releases the PUCCH/SRS resources on the second UL BWP, according to one implementation.

With continued reference to the event 222, the UE 102 in some implementations does not re-initialize the suspended configured grant on the new UL BWP, and does not use this grant to transmit on the PUSCH channel. Currently, the 3GPP TS 38.321 standard describing MAC operations requires that when a UE switches from a first UL BWP to a second UL BWP, the UE suspends the grant configured on the first UL BWP and re-initializes the suspended configured grant on the second UL BWP. The 38.321 standard thus requires that the UE cannot use the configured grant of the first UL BWP to transmit data but can use the configured grant of the second UL BWP to transmit on the second UL BWP. In contrast to the approach described in the 38.321 standard, the UE 102 in this implementation does not re-initialize the suspended configured grant, and thus the grant remains in the suspended state.

The UE 102 maintains the suspension of the PUCCH, SRS, and/or PUSCH resources until the UE 102 determines that the gNB 104 is aware of the switch to the new UL BWP. To this end, the UE 102 in some implementations provides an appropriate notification to the gNB 104. The UE 102 in the example scenario of FIG. 2 performs a contention-free random access procedure, but in general the UE 102 can perform a contention-free or a contention-based random access procedure, as discussed below.

As illustrated in FIG. 2, the UE 102 can transmit 226 a random access preamble on the new UL BWP. More particularly, to conduct a contention-free random access procedure, the RACH resources portion 144 of the processing hardware 140 (see FIG. 1) can store a dedicated random access preamble. After the UE 102 transmits the dedicated random access preamble, the gNB 104 responds by transmitting a DCI on the PDCCH channel of the new UL BWP. The gNB 104 can calculate a Random-Access Radio Network Temporary Identifier (RA-RNTI) using the time-frequency resource of the preamble transmission and address the DCI to the calculated RA-RNTI. The DCI indicates a downlink transmission of a Random Access Response (RAR), encapsulated as a MAC PDU. In another implementation, the gNB 104 addresses the DCI to the Cell RNTI (C-RNTI) of the UE 102, which uniquely identifies the UE 102 in the radio network.

The gNB 104 then transmits 228 the DCI with the RA-RNTI, C-RNTI, or another suitable identity of the UE 102 as the preamble identifier. After the UE 102 determines that the RAR contains the identifier of the dedicated random access preamble, the UE 102 determines that the gNB 104 successfully received the dedicated random access preamble, and accordingly determines 230 that the gNB 104 now is aware of the UL BWP switch.

Alternatively, when the UE 102 instead performs a contention-based random access procedure, the UE 102 does not have a dedicated random access preamble, and instead selects a preamble from a pool which the UE 102 shares with other UEs. After the UE 102 transmits 226 this preamble, the gNB 104 responds 228 with a DCI that includes an indication that the downlink transmission of RAR is addressed to the RA-RNTI calculated as discussed above, as well as a temporary RNTI. Next, the UE 102 determines whether the RAR contains an uplink grant with the identifier of the transmitted preamble and, if so, the UE 102 uses the uplink grant to transmit a first MAC PDU. The UE 102 includes a certain identifier in the first MAC PDU. After UE 102 transmits the first MAC PDU, the UE 102 determines whether the next transmission from the gNB 104 includes a DCI addressed to the temporary RNTI whether and a second MAC PDU (indicated by the DCI) contains the identifier the UE 102 included in the first MAC PDU. When these identifiers match, the UE 102 determines 230 that the gNB 104 is aware of the switch to the new UL BWP.

After the UE 102 determines 230 that the gNB 104 is aware of the UL BWP switch, the UE 102 resumes PUCCH/SRS resources and/or re-initializes the configured grant to transmit on the PUSCH channel (event 232). The UE 102 at this point can use the PUCCH, SRS, and PUSCH resources and expect the gNB 104 to receive these transmissions.

Figure 3:
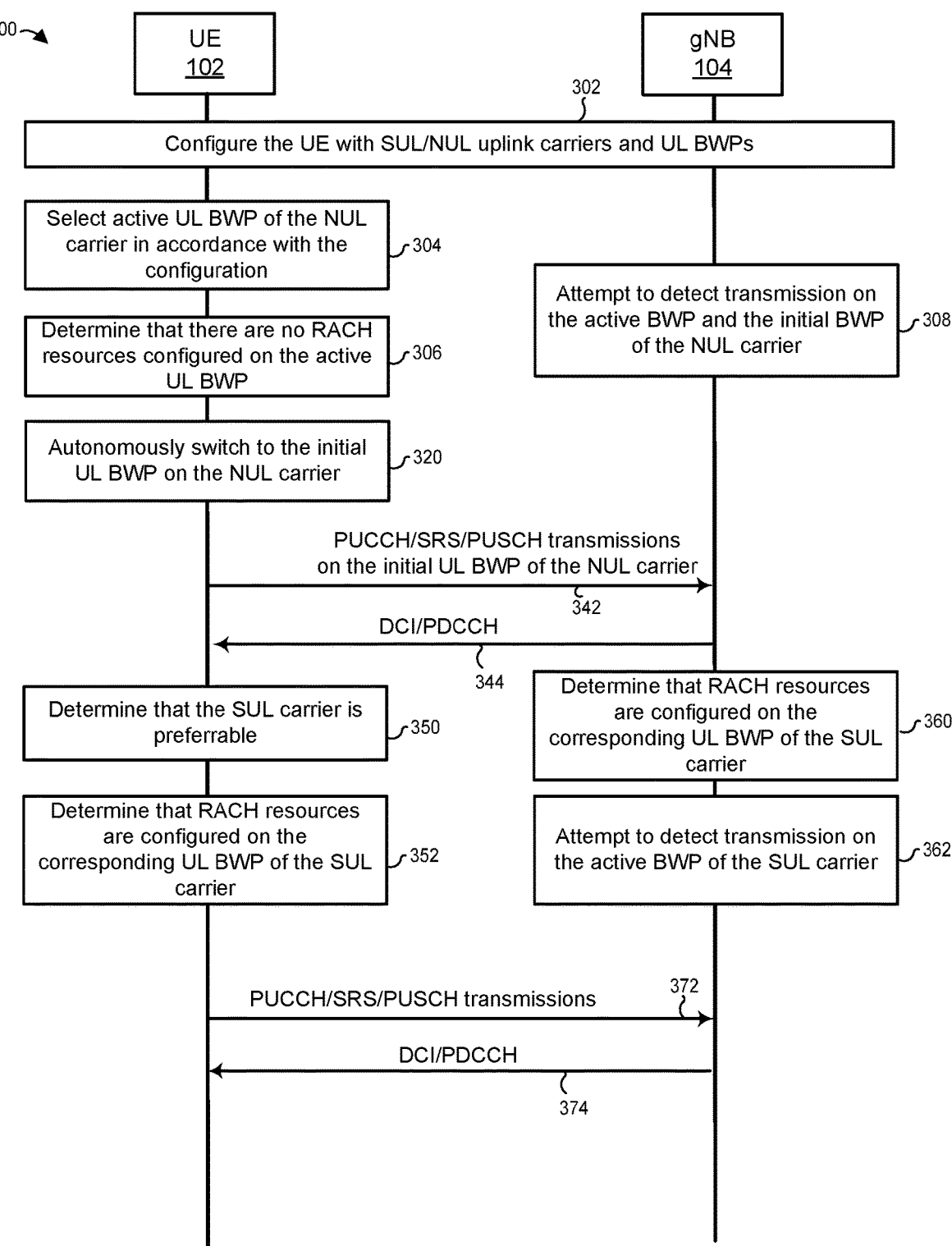
FIG. 3 is a messaging diagram of an example scenario in which the UE of FIG. 1 autonomously switches from one UL BWP to another UL BWP on the NUL carrier, and the base station monitors the new UL BWP to detect a possible transmission from the UE.

Now referring to FIG. 3, the gNB 104 in this scenario monitors one or more UL BWPs to which the UE 102 can switch, so as to detect a possible transmission from the UE 102.

Events 302 and 304 in this scenario are similar to the events 202 and 204 discussed above with reference to FIG. 2. Although the UE 102 can select an active UL BWP on the NUL carrier or the SUL carrier, the UE 102 in this example selects a UL BWP on the NUL carrier.

After the UE 102 detects 306 that there are no RACH resources configured on the active UL BWP, the UE 102 autonomously switches 320 to the initial UL BWP on the NUL carrier. Unlike the scenario discussed above, here the UE 102 does not necessarily suspend transmissions on the new UL BWP, nor does the UE 102 notify the gNB 104 of the switch. Rather, the gNB 104 attempts 308 to detect transmissions from the UE 102 on the currently active UL BWP as well as the one or more UL BWPs to which the UE 102 can switch, in accordance with the configuration provided during the event 302.

More particularly, the UE 102 can lack RACH resources configured for the currently active UL BWP on the NUL carrier and autonomously switch 320 to the initial UL BWP on the NUL carrier. Because the gNB 104 monitors the initial UL BWP along with the currently active UL BWP, when the UE 102 transmits 342 on the initial UL BWP, the gNB 104 detects this transmission. The transmission can occur on the PUCCH, SRS, or PUSCH channel, for example. The gNB 104 then transmits 344 a DCI on the PDCCH to the UE 102, as discussed above.

Further, the gNB 102 can determine 350 that the SUL carrier is preferable, after switching to the initial UL BWP on the NUL carrier or instead of switching to the initial UL BWP on the NUL carrier. The UE 102 then determines 352 whether there are RACH resources configured for the UL BWP of the SUL carrier (e.g., BWP #2) corresponding to the active UL BWP of the NUL carrier (e.g., BWP #2). In some cases, the gNB 104 can configure the UE 102 with an identifier of the UL BWP on the SUL carrier (e.g., BWP #3) which the UE 102 should select if the UE 102 switches to the SUL carrier. The UE 102 switches to the appropriate UL BWP on the SUL carrier after determining that there are RACH resources configured for this UL BWP. The UE 102 designates this UL BWP as the active UL BWP.

The UE 102 again does not necessarily suspend transmissions on the new UL BWP or notify the gNB 104 of the switch. The gNB 104 however determines 360 that the UE 102 has been configured with RACH resources for the UL BWP of the SUL carrier, and accordingly attempts 362 to detect transmissions from the UE 102 on this UL BWP. When the UE 102 transmits 372 on the UL BWP of the SUL carrier, the gNB 104 thus detects this transmission. The transmission can occur on the PUCCH, SRS, or PUSCH channel, for example. The gNB 104 then transmits 374 a DCI on the PDCCH to the UE 102.

Figure 4:
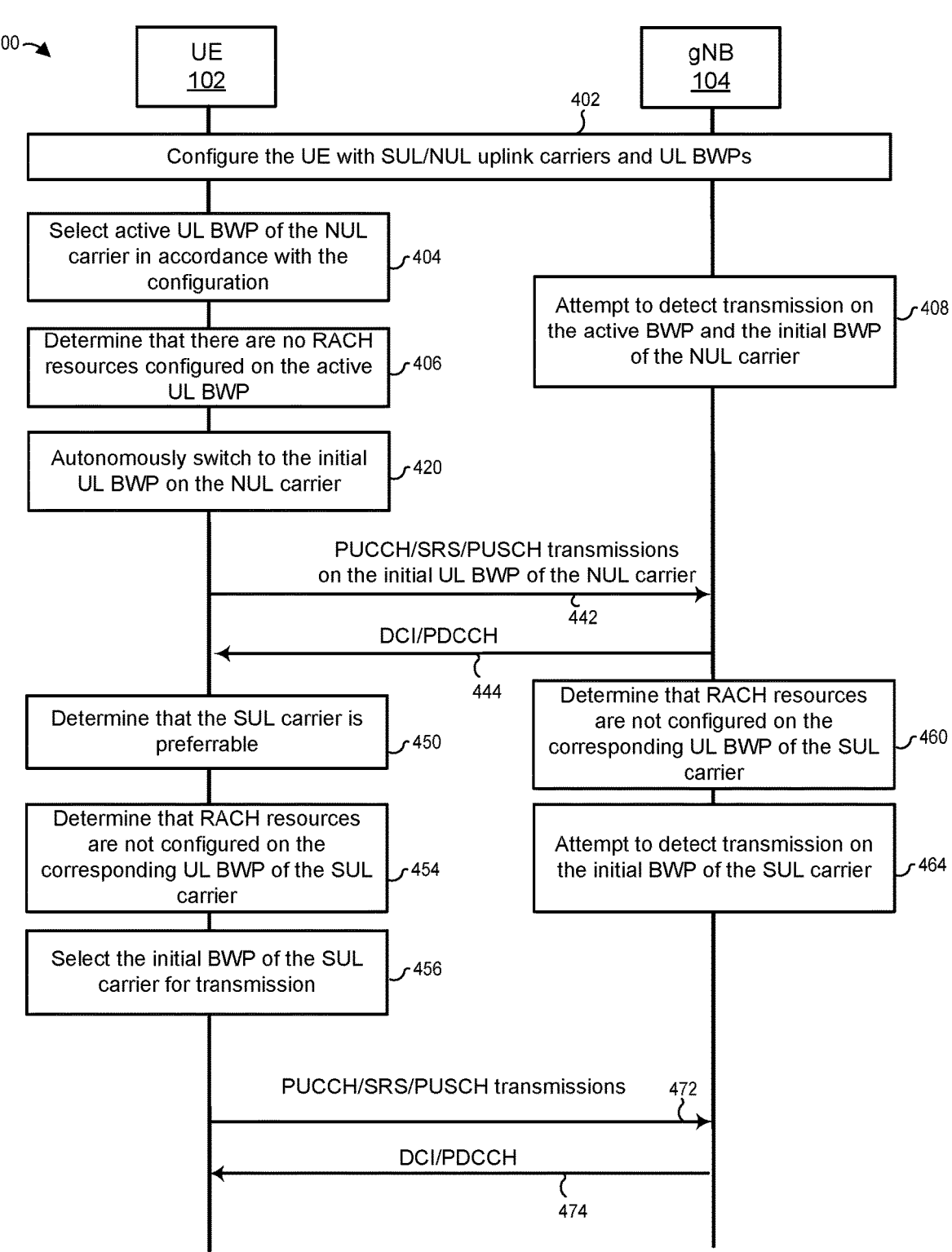
FIG. 4 is a messaging diagram of an example scenario in which the UE of FIG. 1 autonomously switches from one UL BWP on the NUL carrier to another UL BWP on the SUL carrier, and the base station monitors the UL BWPs on the SUL carrier to detect a possible transmission from the UE.

The scenario of FIG. 4 is generally similar to the scenario of FIG. 3, except that here the UE 102 switches to the initial UL BWP of the SUL carrier. Events 402-450 are similar to the events 302-350. However, the UE 102 determines 454 that there are no RACH resources configured for the UL BWP of the SUL carrier. The UE 102 accordingly autonomously selects 456 the initial UL BWP of the SUL carrier. The gNB 104 similarly determines 460 that the UE 102 has no RACH resources configured for the UL BWP of the SUL carrier, and thus attempts 464 to detect transmissions from the UE 102 on the initial UL BWP of the SUL carrier. When the UE 102 transmits 472 on the UL BWP of the SUL carrier, the gNB 104 detects this transmission. The gNB 104 then transmits 474 a DCI on the PDCCH to the UE 102.

Further, in some systems the UE 102 partially implements the technique discussed with reference to FIG. 2, and the gNB 104 partially implements the technique discussed with reference to FIGS. 3 and 4. The UE 102 in these cases suspends only a subset of the PUCCH, SRS, and PUSCH transmissions after switching to a new UL BWP, and the gNB 104 monitors the remaining ones of the PUCCH, SRS, and PUSCH transmissions on the UP BWP(s) to which the UE 102 potentially can switch.

Figure 5:
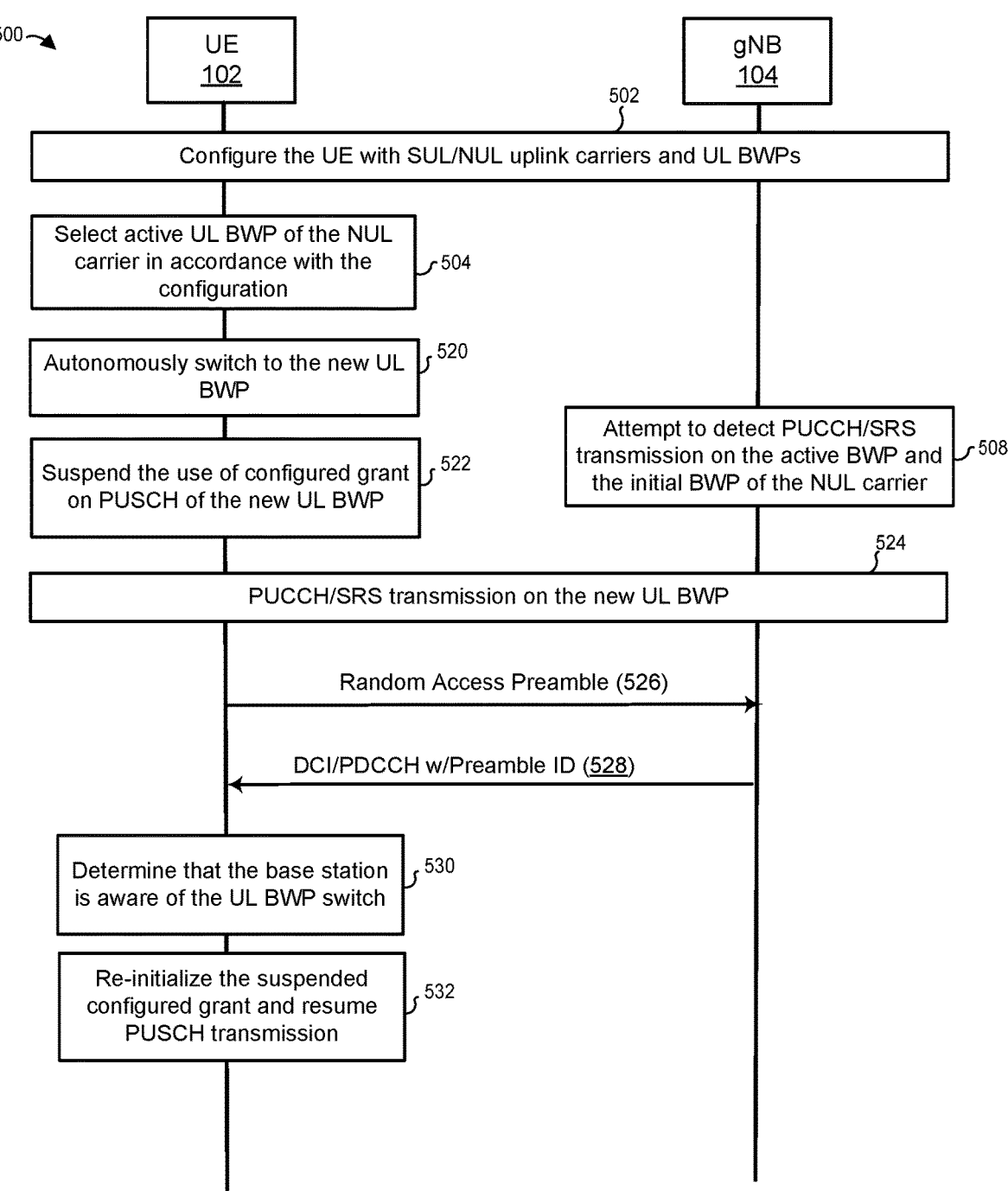
FIG. 5 is a messaging diagram of an example scenario in which the UE of FIG. 1 autonomously switches from one UL BWP to another UL BWP and suspends some but not all communications on the new UL BWP until the base station has detected the switch, and the base station monitors the new UL BWP to detect a possible transmission from the UE.

Referring to FIG. 5, for example, events 502, 504, and 520 are similar to the events 302, 304, and 320 of FIG. 3. The UE 102 then suspends 522 the use of the configured grant on the PUSCH of the new UL BWP, but does not suspend PUCCH or SRS transmissions on the new UL BWP. The gNB 104 attempts 508 to detect transmissions on the PUCCH or SRS channels of the new UL BWP. After the switching, the UE 102 starts to transmit 524 on the PUCCH or SRS channels of the new UL BWP.

To prevent the gNB 104 from missing PUSCH transmissions, the UE 102 notifies the gNB 104 (events 526 and 528, similar to the events 226 and 228 of FIG. 2). After receiving 528 the indication from the gNB 104, the UE 102 determines 530 that the gNB 104 is aware of the switch. The UE 102 then re-initializes 532 the suspended configured grant and resumes PUSCH transmissions on the new UL BWP.

Figure 6:
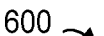
FIG. 6 is a messaging diagram of an example Radio Resource Control (RRC) reconfiguration, which can be carried out in the system of FIG. 1.
Figure 6:
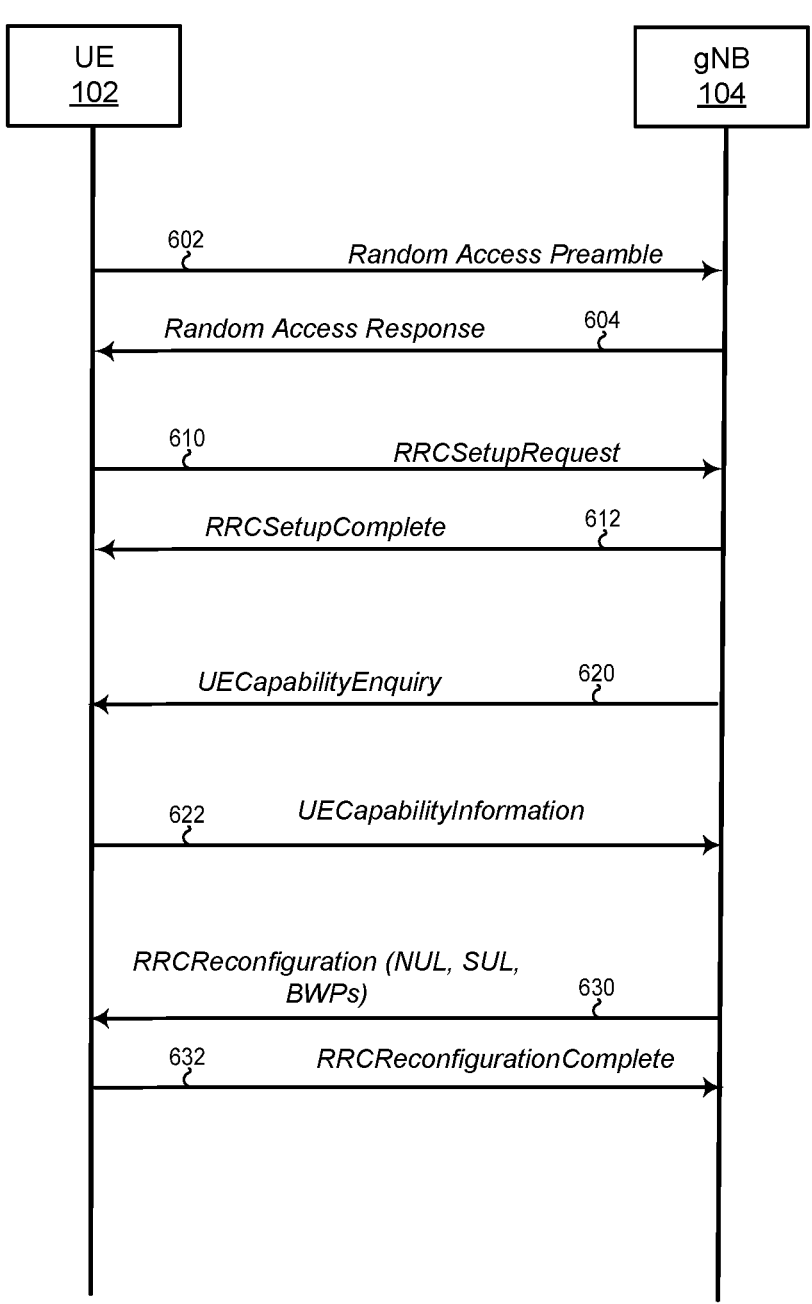

For clarity, FIG. 6 illustrates an example Radio Resource Control (RRC) procedure, which the UE 102 and the gNB 104 can implement. More specifically, the UE 102 and gNB 104 can exchange messages as illustrated in FIG. 6 during the event 202, 302, 402, or 502 discussed above.

The UE 102 transmits 602 a random access preamble, and the gNB 104 responds 604 with a random access response, as discussed above. The UE 102 then transmits 610 an RRCSetupRequest message and, when the gNB 104 can provide an RRC connection, the gNB 104 transmits 612 an RRCSetupComplete message, including an appropriate configuration. In some cases, the gNB 104 can query 620 the UE 102 with a UECapabilityEnquiry message to determine the capabilities of the UE 102 such as the ability to support certain carrier frequencies and the ability to operate in the unlicensed spectrum. More particularly, the NUL carrier 110 and the SUL carrier 112 can be allocated in different portions of the spectrum, and some UEs may not be able to operate in the corresponding frequency bands. The UE 102 can transmit 622 a UECapabilityInformation message to the gNB 104. The gNB 104 can provide 630 NUL, SUL, and UL BWP configuration in an RRCReconfiguration message, and the UE 102 can transmit 632 a RRCReconfigurationComplete message in response.

Next, FIG. 7 is a flow diagram of an example method 700 for switching between UL BWPs, which can be implemented in the UE 102 of FIG. 1 or a similar UE. For example, some or all of the blocks 702-712 can be implemented in the BWP selection controller 142. The method 700 can be implemented using hardware, software, firmware, or any suitable combination of hardware, software, or firmware.

At block 702, the UE 102 receives a configuration specifying multiple UL BWPs. The UE 102 can receive this configuration from the base station such as the gNB 104. The configuration can specify UL BWPs on the NUL carrier and multiple UL BWPs on the SUL carrier, in at least some of the implementations. For each UL BWP, the configuration can include time-frequency resources for PUCCH, SRS, and PUSCH transmissions. Referring back to FIGS. 2-5, block 702 can correspond to events 202, 302, 402, or 502, for example.

At block 704, the UE 102 selects the UL BWP in accordance with the configuration (event 204 of FIG. 2, event 304 of FIG. 3, event 404 of FIG. 4, and event 504 of FIG. 5).

Next, at block 706, the UE 102 determines that it should switch to a new UL BWP, independently of the base station. In other words, the UE 102 makes this decision autonomously rather the in response to a command from the base station (see events 210 and 212 of FIG. 2). In the examples above, the decision at the UE 102 to switch to a new UL BWP corresponds to event 220 of FIG. 2, event 320 of FIG. 3, 420 of FIG. 4, the event 520 of FIG. 5.

At block 708, the UE 102 suspends transmission on at least some of the channels on the new UL BWP (event 222 of FIG. 2 and event 522 of FIG. 5). As discussed above, the UE 102 can suspend all or some of SRS, PUCCH, and PUSCH transmissions.

The UE 102 at block 710 determines that the base station has detected the switch to the UL BWP (event 230 of FIG. 2 and event 320 of FIG. 3). In the examples above, the UE 102 makes this determination based on messaging which the UE 102 initiates (event 226 of FIG. 2 and event 526 of FIG. 5). Then, at block 712, the UE 102 resumes transmissions on the UL BWP (event 232 of FIG. 2 and event 532 of FIG. 5).

Finally, FIG. 8 illustrates a flow diagram of an example method 800 for receiving uplink transmissions from a UE, which can be implemented in the gNB 104 of FIG. 1 or another suitable base station. The method 800 begins at block 802, where the base station transmits a configuration specifying multiple UL BWPs on a NUL carrier and a SUL carrier (event 202 of FIG. 2, event 302 of FIG. 3, event 402 of FIG. 4, or event 502 of FIG. 5). Because the base station selects the configuration for the UE, the base station is aware of the UL BWP which the UE will select as the active UL BWP as well as the UL BWP to which the UE will switch if the UE lacks RACH resources or if the UE decides to switch the between the NUL and SUL carriers. Some of the configuration can be implicit so that, for example, the UE attempts to switch from a certain UL BWP on the NUL carrier to the UL BWP with the same BWP identifier on the SUL carrier. Other configuration can be explicit so that, for example, the UE attempts to switch from a certain UL BWP on the NUL carrier to the UL BWP with an explicitly specified BWP identifier on the SUL carrier.

The gNB 104 at block 804 attempts to detect transmission from the UE on the active UL BWP as well as the initial UL BWP of the same NUL (or SUL) carrier. In the example scenarios above, this block can correspond to event 308 of FIG. 3, event 408 of FIG. 4, or event 508 of FIG. 5.

At block 806, the gNB 104 can determine whether RACH resources are configured on the UL BWP of the SUL carrier to which the UE potentially can switch from the NUL carrier or, conversely, on the UL BWP of the NUL carrier to which the UE potentially can switch from the SUL carrier (event 360 of FIG. 3 or event 460 of FIG. 4). If the gNB 104 determines that the UE has the RACH resources on the corresponding UL BWP of the other carrier, the flow proceeds to block 808. Otherwise, if the gNB 104 determines that the UE does not have the RACH resources on the UL BWP of the other carrier, the flow proceeds to block 810. As discussed above, the corresponding UL BWP of the other (NUL or SUL) carrier can be the UL BWP with the same BWP identifier as the active UL BWP from which the UE is switching, or a UL BWP with a BWP identifier explicitly specified during the configuration step 802.

At block 808, the gNB 104 attempts to detect transmission(s) from the UE on the corresponding UL BWP of the other carrier (event 362). At block 810, the gNB 104 attempts to detect transmission(s) from the UE on the initial UL BWP of the other carrier (event 362).

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for switching between UL BWPs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

The following list of aspects reflects a variety of the embodiments explicitly contemplated by the present disclosure.

Aspect 1. A method in a user equipment (UE) for switching between uplink (UL) bandwidth parts (BWPs) to perform a random access procedure, the method includes: receiving, by processing hardware from a base station, a configuration specifying a plurality of UL BWPs; determining, by the processing hardware at the UE independently of the base station, that the UE should switch from a first UL BWP to a second UL BWP; in response to the determining, switching from the first UL BWP to the second UL BWP, by the processing hardware; receiving, by the processing hardware, an indication that the base station has determined that the UE has switched from the first UL BWP to the second UL BWP; and suspending, by the processing hardware, transmission on at least one channel on the second UL BWP until the indication is received from the base station.

Aspect 2. The method of aspect 1, where the switching comprises: transmitting, by the processing hardware, a random access preamble on the second UL BWP to the base station, wherein the receiving the indication from the base station includes receiving a downlink control element (DCI) on a Physical Downlink Control Channel (PDCCH).

Aspect 3. The method of aspect 2, where DCI is addressed to one of (i) a Random-Access Radio Network Temporary Identifier (RA-RNTI), (ii) a Cell RNTI (C-RNTI), or (iii) a Configured-Scheduling RNTI (CS-RNTI).

Aspect 4. The method of aspect 1, where suspending the transmission includes temporarily preventing the UE from using time-frequency resources on the second UL BWP, including not releasing the time-frequency resources on the second UL BWP.

Aspect 5. The method of aspect 1, where suspending the transmission includes releasing time-frequency resources on the second UL BWP.

Aspect 6. The method of aspect 1, further comprising: in response to receiving the indication, resuming transmission on the time-frequency resources on the second UL BWP.

Aspect 7. The method of aspect 1, where the determining that the UE should switch from a first UL BWP to a second BWP comprises: finding that no time and frequency resources for preamble transmission are configured on the first UL BWP.

Aspect 8. The method of aspect 1, where one of the first UL BWP and the second UL BWP is associated with a normal uplink (NUL) carrier, and the other one of the first UL BWP and the second UL BWP is associated with a supplementary uplink (SUL) carrier.

Aspect 9. The method of aspect 1, where the first UL BWP is an active UL BWP on a carrier, and the second UL BWP is an initial BWP on the carrier.

Aspect 10. The method of aspect 1, where receiving the configuration includes receiving, for each of the plurality UL BWPs, time and frequency resources for one or more of (i) Physical Uplink Control Channel (PUCCH) transmission, (ii) Physical Uplink Shared Channel (PUSCH) transmission, or (iii) Sounding Reference Signal (SRS) transmission.

Aspect 11. The method of aspect 1, where receiving the configuration includes receiving a message that conforms to a protocol for controlling radio resources between the UE and the base station, the message related to one of (i) a connection establishment procedure, (ii) a reconfiguration procedure, (iii) a re-establishment procedure, (iv) a connection resume procedure, or (v) system information reception procedure.

Aspect 12. The method of aspect 1, where suspending the transmission on the second UL BWP includes suspending transmission on some but not all of a PUSCH channel, a PUCCH channel, or an SRS channel; the method further comprising: not suspending transmission on remaining one or more of the PUSCH channel, the PUCCH channel, or the SRS channel.

Aspect 13. A UE including processing hardware configured to execute a method according to any of the preceding aspects.

Aspect 14. A method in a base station for receiving uplink transmissions from a UE, the method including: transmitting, by processing hardware to the UE, a configuration including respective time-frequency resources for each of a plurality of UL BWPs; receiving, by the processing hardware, a first transmission from the UE on a first one of the plurality of UL BWPs; identifying, by the processing hardware at the base station independently of the UE, a second one of the plurality of UL BWPs to which the UE is capable of switching; and attempting to receive, by the processing hardware, a second transmission from the UE on the second one of the plurality of UL BWPs.

Aspect 15. The method of aspect 14, where the first one of the plurality of UL BWPs is one of a NUL carrier or a SUL carrier, and the second one of the plurality of UL BWPs is the other one of the NUL carrier or the SUL carrier.

Aspect 16. The method of aspect 15, where the first one of the plurality of UL BWPs and the second one of the plurality of UL BWPs have a same BWP identifier on the NUL carrier and the SUL carrier, respectively.

Aspect 17. The method of aspect 15, where the configuration specifies a BWP identifier of the second one of the plurality of UL BWPs on the corresponding carrier.

Aspect 18. The method of aspect 15, where identifying the second one of the plurality of UL BWPs includes: determining whether the UE is configured with time-frequency resources on the other one of the NUL carrier or the SUL carrier; in response to determining that the UE is not configured with the time-frequency resources, attempting to receive the second transmission on an initial UL BWP of the other one of the NUL carrier or the SUL carrier; and otherwise, in response to determining that the UE is configured with the time-frequency resources, attempting to receive the second transmission on a non-initial UL BWP of the other one of the NUL carrier or the SUL carrier, corresponding to the first one of the plurality of UL BWPs.

Aspect 19. The method of aspect 14, where the first one of the plurality of UL BWPs is an active UL BWP on a NUL or SUL carrier, and the second one of the plurality of UL BWPs is an initial UL BWP on the NUL or SUL carrier.

Aspect 20. The method of aspect 14, wherein attempting to receive the second transmission includes attempting to detect at least one of a PUSCH transmission, a PUCCH transmission, or an SRS transmission.

Aspect 21. The method of aspect 14, where transmitting the configuration includes transmitting, for each of the plurality UL BWPs, time and frequency resources for one or more of (i) Physical Uplink Control Channel (PUCCH) transmission, (ii) Physical Uplink Shared Channel (PUSCH) transmission, or (iii) Sounding Reference Signal (SRS) transmission.

Aspect 22. The method of aspect 14, where transmitting the configuration includes transmitting a message that conforms to a protocol for controlling radio resources between the UE and the base station, the message related to a connection establishment procedure.

Aspect 23. The method of aspect 14, where transmitting the configuration includes transmitting a message that conforms to a protocol for controlling radio resources between the UE and the base station, the message related to a reconfiguration procedure.

Aspect 24. The method of aspect 14, where transmitting the configuration includes transmitting a message that conforms to a protocol for controlling radio resources between the UE and the base station, the message related to a re-establishment procedure.

Aspect 25. The method of aspect 14, where transmitting the configuration includes transmitting a message that conforms to a protocol for controlling radio resources between the UE and the base station, the message related to a connection resume procedure.

Aspect 26. The method of aspect 14, where transmitting the configuration includes transmitting a message that conforms to a protocol for controlling radio resources between the UE and the base station, the message related to system information reception procedure.

Aspect 27. The method of aspect 14, further comprising: transmitting, by the processing hardware to the UE, a command to switch to a third one of the plurality of UL BWPs; and attempting to receive, by the processing hardware, the second transmission from the UE on the third one of the plurality of UL BWPs.

Aspect 28. A base station including processing hardware to execute a method according to any of aspect 14-27.

What is claimed is:

1. A method in a base station for receiving uplink transmissions from a UE, the method comprising:
   transmitting, to the UE, a configuration including respective time-frequency resources for each of a plurality of UL BWPs;
   receiving a transmission from the UE on a first one of the plurality of UL BWPs defining an initial UL BWP associated with a first carrier or a second one of the plurality of UL BWPs defining an active UL BWP associated with the first carrier; and
   in response to determining that the UE is not configured with time-frequency resources to transmit a random access preamble on a fourth one of the plurality of UL BWPs defining to an active UL BWP associated with a second carrier different from the first carrier, attempting to receive a Physical Uplink Control Channel (PUCCH) transmission, from the UE on a third one of the plurality of UL BWPs defining an initial UL BWP associated with the second carrier, without transmitting a command to the UE to switch to the third one of the plurality of UL BWPs.

2. The method of claim 1, wherein the first carrier is one of a NUL carrier or a SUL carrier, and the second carrier is the other one of the NUL carrier or the SUL carrier.

3. The method of claim 2, wherein the first one of the plurality of UL BWPs and the third one of the plurality of UL BWPs have a same BWP identifier on the NUL carrier and the SUL carrier, respectively.

4. The method of claim 1, further comprising:
   in response to determining that the UE is configured with the time-frequency resources, attempting to receive the SRS transmission, the PUSCH transmission, or the PUCCH transmission on a non-initial UL BWP on the fourth one of the plurality of UL BWPs.

5. The method of claim 1, wherein transmitting the configuration includes transmitting a message that conforms to a protocol for controlling radio resources between the UE and the base station, the message related to a connection establishment procedure.

6. The method of claim 1, wherein transmitting the configuration includes transmitting a message that conforms to a protocol for controlling radio resources between the UE and the base station, the message related to a reconfiguration procedure.

7. The method of claim 1, wherein transmitting the configuration includes transmitting a message that conforms to a protocol for controlling radio resources between the UE and the base station, the message related to a re-establishment procedure.

8. The method of claim 1, wherein transmitting the configuration includes transmitting a message that conforms to a protocol for controlling radio resources between the UE and the base station, the message related to a connection resume procedure.

9. The method of claim 1, wherein transmitting the configuration includes transmitting a message that conforms to a protocol for controlling radio resources between the UE and the base station, the message related to system information reception procedure.

10. A base station including processing hardware and configured to:

transmit, to the UE, a configuration including respective time-frequency resources for each of a plurality of UL BWPs;

receive a transmission from the UE on a first one of the plurality of UL BWPs defining an initial UL BWP associated with a first carrier or a second one of the plurality of UL BWPs defining an active UL BWP associated with the first carrier; and in response to determining that the UE is not configured with time-frequency resources to transmit a random access preamble on a fourth one of the plurality of UL BWPs defining to an active UL BWP associated with a second carrier different from the first carrier, attempt to receive a Physical Uplink Control Channel (PUCCH) transmission from the UE on a third one of the plurality of UL BWPs defining an initial UL BWP associated with the second carrier, without transmitting a command to the UE to switch to the third one of the plurality of UL BWPs.

11. The base station of claim 10, wherein the first carrier is one of a NUL carrier or a SUL carrier, and the second carrier is the other one of the NUL carrier or the SUL carrier.

12. The base station of claim 11, wherein the first one of the plurality of UL BWPs and the third one of the plurality of UL BWPs have a same BWP identifier on the NUL carrier and the SUL carrier, respectively.

13. The base station of claim 11, configured to:

in response to determining that the UE is configured with the time-frequency resources, attempt to receive the SRS transmission, the PUSCH transmission, or the PUCCH transmission on a non-initial UL BWP on the fourth one of the plurality of UL BWPs.

14. The base station of claim 11, wherein:

to transmit the configuration, the base station is configured to transmit a message that conforms to a protocol for controlling radio resources between the UE and the base station, the message related to a connection establishment procedure.

15. The base station of claim 11, wherein:

to transmit the configuration, the base station is configured to transmit a message that conforms to a protocol for controlling radio resources between the UE and the base station, the message related to a reconfiguration procedure.

16. The base station of claim 11, wherein:

to transmit the configuration, the base station is configured to transmit a message that conforms to a protocol for controlling radio resources between the UE and the base station, the message related to a re-establishment procedure.

17. The base station of claim 11, wherein:

to transmit the configuration, the base station is configured to transmit a message that conforms to a protocol for controlling radio resources between the UE and the base station, the message related to a connection resume procedure.

18. The base station of claim 11, wherein:

to transmit the configuration, the base station is configured to transmit a message that conforms to a protocol for controlling radio resources between the UE and the base station, the message related to system information reception procedure.

* * * * *